United States Patent
Ota et al.

(10) Patent No.: US 12,435,176 B2
(45) Date of Patent: Oct. 7, 2025

(54) CURABLE RESIN COMPOSITION

(71) Applicant: ADEKA CORPORATION, Tokyo (JP)

(72) Inventors: Keisuke Ota, Kuki (JP); Masato Inadome, Kuki (JP); Yukako Ishigami, Kuki (JP); Ryo Ogawa, Kuki (JP); Tamotsu Nagamatsu, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 728 days.

(21) Appl. No.: 17/288,372

(22) PCT Filed: Nov. 7, 2019

(86) PCT No.: PCT/JP2019/043676
§ 371 (c)(1),
(2) Date: Apr. 23, 2021

(87) PCT Pub. No.: WO2020/095995
PCT Pub. Date: May 14, 2020

(65) Prior Publication Data
US 2021/0380749 A1 Dec. 9, 2021

(30) Foreign Application Priority Data

Nov. 8, 2018 (JP) ................. 2018-210877

(51) Int. Cl.
| | |
|---|---|
| *C08G 18/00* | (2006.01) |
| *C08G 18/10* | (2006.01) |
| *C08G 18/28* | (2006.01) |
| *C08G 18/32* | (2006.01) |
| *C08G 18/48* | (2006.01) |
| *C08G 18/66* | (2006.01) |
| *C08G 18/80* | (2006.01) |
| *C08G 59/14* | (2006.01) |
| *C08L 75/04* | (2006.01) |
| *C09J 163/00* | (2006.01) |
| *C09J 175/08* | (2006.01) |

(52) U.S. Cl.
CPC ........... *C08G 18/003* (2013.01); *C08G 18/10* (2013.01); *C08G 18/2815* (2013.01); *C08G 18/3221* (2013.01); *C08G 18/4829* (2013.01); *C08G 18/4854* (2013.01); *C08G 18/6677* (2013.01); *C08G 18/80* (2013.01); *C08L 75/04* (2013.01); *C09J 163/00* (2013.01); *C09J 175/08* (2013.01); *C08G 59/14* (2013.01); *C08G 2170/00* (2013.01)

(58) Field of Classification Search
CPC .... C08G 18/58; C08G 18/28; C08G 18/2815; C08G 18/285; C08G 18/286; C08G 18/2865; C08G 18/3278; C08G 18/3206; C08G 18/324; C08G 18/4829; C08G 18/40; C08G 18/30; C08L 63/00; C08L 75/04; C09J 163/00
See application file for complete search history.

(56) References Cited

U.S. PATENT DOCUMENTS

| | | | |
|---|---|---|---|
| 3,886,122 A * | 5/1975 | Fabris | C08G 18/10 528/53 |
| 5,278,257 A | 1/1994 | Mulhaupt et al. | |
| 2005/0159511 A1 | 7/2005 | Kramer | |
| 2008/0319105 A1 * | 12/2008 | Lutz | C08G 18/6677 523/400 |
| 2009/0131605 A1 | 5/2009 | Baba et al. | |
| 2014/0031500 A1 | 1/2014 | Matsumura et al. | |
| 2017/0369629 A1 | 12/2017 | Mashima et al. | |
| 2018/0163104 A1 | 6/2018 | Lutz et al. | |

FOREIGN PATENT DOCUMENTS

| | | |
|---|---|---|
| CN | 107541014 A | 1/2018 |
| EP | 2 344 561 B1 | 7/2015 |
| JP | 52-114622 | 9/1977 |
| JP | 53-10652 | 1/1978 |
| JP | S53-10652 A | 1/1978 |
| JP | H03-220221 A | 9/1991 |
| JP | 2002-294207 A | 10/2002 |
| JP | 2012-219222 | 11/2012 |
| JP | 2012-219223 | 11/2012 |
| JP | 2017-088736 A | 5/2017 |

OTHER PUBLICATIONS

International Search Report for PCT/JP2019/043676 mailed Feb. 10, 2020, 4 pages.

* cited by examiner

*Primary Examiner* — Marc S Zimmer
*Assistant Examiner* — Surbhi M Du
(74) *Attorney, Agent, or Firm* — NIXON & VANDERHYE

(57) ABSTRACT

Disclosed is a structural material-bonding adhesive capable of bonding materials other than iron, and maintaining the bonding ability in an environment at a high temperature and a low temperature, while maintaining performance similar to that of a structural material adhesive used as an adhesive for bonding iron materials. A curable resin composition contains an epoxy resin, blocked urethane, and an amine-based latent curing agent, wherein the blocked urethane is obtained by reacting a urethane polymer having a terminal isocyanate group with a blocking agent, the urethane polymer being obtained by reacting a polyisocyanate, a diol, and a branching agent containing at least three groups that react with an isocyanate group.

10 Claims, No Drawings

CURABLE RESIN COMPOSITION

This application is the U.S. national phase of International Application No. PCT/P2019/043676 filed Nov. 7, 2019 which designated the U.S. and claims priority to JP Patent Application No. 2018-210877 filed Nov. 8, 2018, the entire contents of each of which are hereby incorporated by reference.

TECHNICAL FIELD

The present invention relates to a curable resin composition containing an epoxy resin, blocked urethane, and an amine-based latent curing agent.

BACKGROUND ART

Techniques for bonding structural materials can be applied to a wide range of industries such as the transportation equipment field (automobiles, railroad vehicles, aircrafts, etc.), the energy field (power plants, etc.), and the infrastructure field (bridges, buildings, etc.). In the automobile industry to date, materials such as iron have been used for bodies and engines, but environment- and safety-conscious materials are in demand following the need for controlling emissions of $CO_2$ and improving fuel efficiency, and materials such as aluminum and resin materials are being extensively developed as alternative materials to iron. Aluminum has been gaining attention due to its small specific gravity that is about ⅓ of the specific gravity of iron, high thermal conductivity, and good corrosion resistance, and due to better recyclability than that of resin materials. Examples of resin materials that are alternative materials to iron, other than aluminum, include fiber reinforced plastics (FRP) obtained by reinforcing unsaturated polyester, a polyurethane resin, or an epoxy resin with fiber materials such as glass fibers or carbon fibers.

An epoxy resin is used in a wide range of industrial applications such as paints, casting materials, adhesives, and civil engineering and construction, and a resin composition further containing blocked urethane obtained by blocking a terminal isocyanate group (NCO group) of a polyurethane resin using a blocking agent has a high bonding strength and is used as a structural material-bonding adhesive (Patent Literatures 1 and 2, for example). However, although the structural material-bonding adhesives using a resin composition described in the above-mentioned documents have good properties for bonding iron materials, they are problematic in terms of properties for bonding other materials.

There are known methods for bonding a steel material and an FRP material, using together a modified epoxy resin that has been made flexible and blocked urethane as an adhesive for bonding materials other than iron (Patent Literature 3, for example). According to this method, the bonding strength to an FRP material is increased by controlling the modulus of elasticity of the cured material while making it flexible to be some extent, but the method is problematic in terms of maintaining the bonding strength at a high temperature or a low temperature, and is not satisfactory as a material that is used in an environment where the material is exposed to a high temperature as in summer or an environment at a low temperature as in winter in north Europe or north America.

Furthermore, there are other known methods for improving the quality of an adhesive by adding other components to an epoxy resin and blocked urethane, and high-strength and high-bonding adhesives are provided in which a urea derivative obtained through a reaction between aromatic isocyanate and aliphatic amine is added as a thixotropy agent (Patent Literature 4, for example). However, although these methods provide good physical properties such as shock resistance, tensile properties, and shear strength, they are problematic in terms of realizing satisfactory properties for bonding the above-mentioned various types of materials and maintaining the bonding strength at a high temperature and a low temperature.

CITATION LIST

Patent Literatures

Patent Literature 1: JP H03-220221A
Patent Literature 2: US 20090131605
Patent Literature 3: JP 2017-088736A
Patent Literature 4: US 20050159511

SUMMARY OF INVENTION

It is an object of the present invention to provide a resin composition for a structural material-bonding adhesive capable of bonding materials other than iron, and maintaining the bonding ability in an environment at a high temperature and a low temperature, while maintaining performance similar to that of a structural material adhesive used as an adhesive for bonding iron materials.

The inventors of the present invention conducted an in-depth study and found that a curable resin composition obtained by adding a specific branching agent as a material of blocked urethane has good properties for bonding materials other than iron and high flexibility, and is capable of bonding materials in a wide temperature region ranging from a low temperature to a high temperature, and thus the present invention was achieved. That is to say, the present invention is directed to a curable resin composition containing an epoxy resin (A), blocked urethane (C), and an amine-based latent curing agent (D), wherein the blocked urethane (C) is obtained by reacting a urethane polymer having a terminal isocyanate group with a blocking agent (C-4), the urethane polymer being obtained by reacting a polyisocyanate (C-1), a diol (C-2), and a branching agent (C-3) containing at least three groups that react with an isocyanate group, the ratio of the number of moles of isocyanate groups in the component (C-1) relative to the total number of moles of hydroxyl groups in the component (C-2) and groups that react with an isocyanate group in the component (C-3) is 1.2 or more and less than 1.8, and the number of moles of hydroxyl groups in the component (C-2) is from 1 to 50% of the total number of moles of hydroxyl groups in the component (C-2) and groups that react with an isocyanate group in the component (C-3).

Advantageous Effects of Invention

The present invention has an effect of making it possible to provide a curable resin composition, and a structural material-bonding adhesive containing the resin composition, capable of bonding materials other than iron and maintaining the bonding ability in an environment at a high temperature and a low temperature. The structural material-bonding adhesive of the present invention has a good balance between the modulus of elasticity and the elongation of the cured material, and excellent bonding properties in an environment at a high temperature and a low temperature, and thus it can be applied to various types of transportation equipment such as automobiles, railroad vehicles, and aircrafts in which aluminum, FRP, and the like are used.

DESCRIPTION OF EMBODIMENTS

The curable resin composition of the present invention contains an epoxy resin (A), blocked urethane (C), and an amine-based latent curing agent (D), wherein the blocked urethane (C) is obtained by reacting a polyisocyanate, a diol, and a branching agent at a specific ratio.

As the epoxy resin (A) in the present invention, known materials may be used, and examples thereof include: polyglycidyl ether compounds of mononuclear polyhydric phenol compounds such as hydroquinone, resorcin, pyrocatechol, and phloroglucinol; polyglycidyl ether compounds of polynuclear polyhydric phenol compounds such as dihydroxynaphthalene, biphenol, methylenebisphenol (bisphenol F), methylenebis(orthocresol), echilidenbisphenol, isopropyridenebisphenol (bisphenol A), isopropyridenbis (orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, orthocresol novolac, ethylphenol novolac, butylphenol novolac, octylphenol novolac, resorcin novolac, and terpene phenol; polyglycidyl ethers of polyhydric alcohols such as ethylene glycol, propylene glycol, butylene glycol, hexanediol, polyglycol, thiodiglycol, dicyclopentadiene dimethanol, 2,2-bis(4-hydroxycyclohexylpropane (hydrogenated bisphenol A), glycerin, trimethylolpropane, pentaerythritol, sorbitol, and bisphenol A-alkylene oxide adducts; homopolymers or copolymers of glycidyl esters and glycidyl methacrylates of aliphatic, aromatic, or alicyclic polybasic acid such as maleic acid, fumaric acid, itaconic acid, succinic acid, glutaric acid, suberic acid, adipic acid, azelaic acid, sebacic acid, dimer acid, trimeric acid, phthalic acid, isophthalic acid, terephthalic acid, trimellitic acid, trimesic acid, pyromellitic acid, tetrahydrophthalic acid, hexahydrophthalic acid, and endomethylenetetrahydrophthalic acid; epoxy compounds having glycidylamino groups such as N,N-diglycidylaniline, bis(4-(N-methyl-N-glycidylamino)phenyl)methane, diglycidylorthotoluidine, N,N-bis(2,3-epoxypropyl)-4-(2,3-epoxypropoxy)-2-methylaniline, N,N-bis(2,3-epoxypropyl)-4-(2,3-epoxypropoxy)aniline, and N,N,N',N'-tetra(2,3-epoxypropyl)-4,4'-diaminodiphenylmethane; epoxy compounds of cyclic olefin compounds such as vinylcyclohexene diepoxide, dicyclopentanediene diepoxide, 3,4-epoxycyclohexylmethyl-3,4-epoxycyclohexanecarboxylate, 3,4-epoxy-6-methylcyclohexylmethyl-6-methylcyclohexanecarboxylate, and bis(3,4-epoxy-6-methylcyclohexylmethyl)adipate; and epoxidized conjugated diene polymers such as epoxidized polybutadiene and epoxidized styrene-butadiene copolymer, and heterocyclic compounds such as triglycidyl isocyanurate.

Furthermore, as the epoxy resin (A), a urethane-modified epoxy resin obtained by adding a urethane skeleton to an epoxy resin may be used. The urethane-modified epoxy resin has an epoxy group and a urethane bond in the molecule, and can be obtained, for example, by reacting an epoxy compound having a hydroxyl group in the molecule with a compound having an isocyanate group, using a known method described in JP 2016-210922A and the like.

In the present invention, of these epoxy resins, from the viewpoint of realizing satisfactory physical properties and bonding properties of the curable material, and availability and inexpensiveness, it is preferable to use a polyglycidyl ether compound of polynuclear polyhydric phenol compounds or a polyglycidyl ether of polyhydric alcohols, and more preferable to use bisphenol A diglycidyl ether or bisphenol F diglycidyl ether.

The blocked urethane (C) in the present invention is obtained by reacting a urethane polymer having a terminal isocyanate group with a blocking agent (C-4), the urethane polymer being obtained by reacting a polyisocyanate (C-1), a diol (C-2), and a branching agent (C-3) containing at least three groups that react with an isocyanate group.

That is to say, the blocked urethane (C) in the present invention has a structure in which a terminal isocyanate group of a urethane polymer having the terminal isocyanate group is blocked by a blocking agent (C-4), the urethane polymer being obtained from a polyisocyanate (C-1), a diol (C-2), and a branching agent (C-3) containing at least three groups that react with an isocyanate group.

As the polyisocyanate (C-1), any compound having at least two isocyanate groups in the molecule may be used, and examples thereof include aromatic diisocyanates such as phenylene diisocyanate, tolylene diisocyanate, diphenylmethane diisocyanate, naphthalene diisocyanate, and xylylene diisocyanate, and aliphatic or aliphatic cyclic structure-containing diisocyanates such as hexamethylene diisocyanate, lysine diisocyanate, cyclohexane diisocyanate, isophorone diisocyanate, 4,4'-dicyclohexylmethane diisocyanate, and tetramethylxylylene diisocyanate. They may be used alone or in combination of two or more. Of these compounds, from the viewpoint of excellent weather resistance and availability at low cost, it is preferable to use an aliphatic or aliphatic cyclic structure-containing diisocyanate, and more preferable to use hexamethylene diisocyanate or isophorone diisocyanate.

As the diol (C-2), any compound having two hydroxyl groups in the molecule may be used, and examples thereof include polyester diol, polycarbonate diol, and polyether diol.

Examples of the polyester diol include compounds obtained by subjecting a low molecular weight diol and a dicarboxylic acid to esterification, compounds obtained by subjecting a cyclic ester compound such as ε-caprolactone and γ-valerolactone to ring-opening polymerization, and copolyesters thereof.

Examples of the low molecular weight diol that may be used as a raw material of the polyester diol include: aliphatic diols such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentylglycol, 2-butyl-2-ethyl-1,3-propanediol, 3-methyl-1,5-pentanediol, 2-ethyl-1,3-hexanediol, and 2-methyl-1,8-octanediol; aliphatic cyclic structure-containing diols such as 1,4-cyclohexanedimethanol, and hydrogenated bisphenol A; and bisphenol type diols such as bisphenol A, alkylene oxide adducts of bisphenol A, bisphenol S, and alkylene oxide adducts of bisphenol S. They may be used alone or in combination of two or more.

Examples of the dicarboxylic acid that may be used as a raw material of the polyester diol include: aliphatic dicarboxylic acids of succinic acid, adipic acid, suberic acid, azelaic acid, sebacic acid, dodecanedicarboxylic acid, and dimer acid; alicyclic dicarboxylic acids such as 1,4-cyclohexanedicarboxylic acid; aromatic dicarboxylic acids such as orthophthalic acid, isophthalic acid, terephthalic acid, 1,4-naphthalenedicarboxylic acid, 2,3-naphthalenedicarboxylic acid, 2,6-naphthalenedicarboxylic acid, and biphenyldicarboxylic acid; and anhydrides and ester derivatives thereof. They may be used alone or in combination of two or more.

Examples of the polycarbonate diol include those obtained by reacting a carbonic acid ester and/or phosgene, and a diol. Examples of the carbonic acid ester include dimethyl carbonate, diethyl carbonate, methyl ethyl carbonate, ethylene carbonate, propylene carbonate, butylene carbonate, diphenyl carbonate, dinaphthyl carbonate, and phenylnaphthyl carbonate.

Examples of the diol that may be used as a raw material of the polyester diol include a low molecular weight diol that may be used as a raw material of the polyester diol, polyether polyols such as polyethylene glycol, polypropylene glycol, and polytetramethylene glycol, and polyester polyols such as polyhexamethylene adipate, polyhexamethylene succinate, and polycaprolactone. They may be used alone or in combination of two or more.

Examples of the polyether diol include alkylene oxide addition polymers using a polyol, a polyamine, or the like as an initiator, and compounds obtained by subjecting a cyclic ether compound to ring-opening polymerization.

Examples of the alkylene oxide include ethylene oxide, propylene oxide, butylene oxide, styrene oxide, epichlorohydrin, and tetrahydrofuran.

Examples of the initiator include water, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentylglycol, 2-butyl-2-ethyl-1,3-propanediol, 3-methyl-1,5-pentanediol, 2-ethyl-1,3-hexanediol, 2-methyl-1,8-octanediol, ethylenediamine, 1,2-diaminopropane, 1,3-diaminopropane, 1,2-diaminobutane, 1,3-diaminobutane, 1,4-diaminobutane, phosphoric acid, and alkyl acid phosphate.

Examples of the cyclic ether compound include tetrahydrofuran, ethylene oxide, propylene oxide, oxetane, tetrahydropyran, oxepane, and 1,4-dioxane.

In the present invention, of these diols, from the viewpoint of excellent bonding properties at a low temperature and the like, it is preferable to use a polyether diol, more preferable to use a propylene oxide addition polymer using water or propylene glycol as an initiator, or a compound obtained by subjecting tetrahydrofuran to ring-opening polymerization (polytetramethylene glycol), and even more preferable to use polytetramethylene glycol.

From the viewpoint of the balance between the bonding properties of the resin composition and the viscosity of the urethane polymer that is produced, the number average molecular weight of the diol (C-2) is preferably from 500 to 10000, more preferably from 1000 to 5000, and even more preferably from 2000 to 4000. Note that the number average molecular weight can be measured by a known method using polystyrene as the molecular weight standard in gel permeation chromatography (GPC).

The component (C-3) is a branching agent having at least three groups that react with an isocyanate group. Examples of the groups that react with an isocyanate group include a hydroxyl group, an amino group, a mercapto group, and a carboxyl group. In the present invention, from the viewpoint of the balance between the reactivity of the isocyanate group and the performance of the resin composition, for example, it is preferable to use a hydroxyl group or an amino group, and more preferable to use a hydroxyl group.

Examples of the branching agent having at least three hydroxyl groups include trimethylolethane, trimethylolpropane, ditrimethylolpropane, tritrimethylolpropane, 1,2,6-hexanetriol, triethanolamine, triisopropanolamine, pentaerythritol, dipentaerythritol, sorbitol, saccharose, and compounds obtained by adding an alkylene oxide such as ethylene oxide or propylene oxide to these compounds. They may be used alone or in combination of two or more.

The compounds obtained by adding the alkylene oxide may be commercially available products, and examples thereof include ADEKA Polyether series AM-302, AM-502, AM-702, GM-30, GR-2505, GR-3308, G-300, G-400, G-700, G-1500, G-3000B, G-4000, and T-400 manufactured by ADEKA Corporation.

Examples of the branching agent having at least three amino groups include melamine and polyether polyamine. Examples of the commercially available polyether polyamine include Jeffamine series T-403, T-3000, and T-5000 manufactured by Huntsman. They may be used alone or in combination of two or more.

In the present invention, of these branching agents, from the viewpoint of the balance between the bonding properties of the resin composition and the producibility of the urethane polymer, it is preferable to use a branching agent having at least three hydroxyl groups, and more preferable to use a propylene oxide adduct of trimethylolpropane, sorbitol, or glycerin, or a propylene oxide adduct of trimethylolpropane, and, from the viewpoint of reducing the viscosity of the blocked urethane and realizing good usability, it is more preferable to use a propylene oxide adduct of glycerin or a propylene oxide adduct of trimethylolpropane.

Examples of the blocking agent (C-4) include: active methylene compounds such as malonic acid diester (diethyl malonate, etc.), acetylacetone, and acetoacetic acid ester (ethyl acetoacetate, etc.); oxime compounds such as acetooxime, methyl ethyl ketoxime (MEK oxime), and methyl isobutyl ketoxime (MIBK oxime); monohydric alcohols such as methyl alcohol, ethyl alcohol, propyl alcohol, butyl alcohol, heptyl alcohol, hexyl alcohol, octyl alcohol, 2-ethyl hexyl alcohol, isononyl alcohol, and stearyl alcohol, and isomers thereof; glycol derivatives such as methyl glycol, ethyl glycol, ethyl diglycol, ethyl triglycol, butyl glycol, and butyl diglycol; amine compounds such as dicyclohexylamine; monophenols such as phenol, cresol, ethylphenol, n-propylphenol, isopropylphenol, butylphenol, tert-butylphenol, octylphenol, nonylphenol, dodecylphenol, cyclohexylphenol, chlorophenol, bromophenol, paracumylphenol, cardanol, 2-allylphenol, p-methoxyphenol, o-methoxyphenol, 2,4-dimethoxyphenol, 2,6-dimethoxyphenol, isoeugenol, and 4-(dimethylamino)phenol; diphenols such as resorcin, catechol, hydroquinone, bisphenol A, diallyl bisphenol A, bisphenol S, bisphenol F, naphthol, p-tert-butylcatechol, and 2,4-dihydroxybenzophenone; and ε-caprolactam. Of these compounds, from the viewpoint of reliably obtaining a curable resin composition with strong bonding properties, it is preferable to use at least one compound selected from the group consisting of dicyclohexylamine, diphenols, monophenols, and ε-caprolactam, more preferable to use a monophenol, and even more preferable to use tert-butylphenol, nonylphenol, dodecylphenol, p-cumylphenol, cardanol, 2-allylphenol, or p-methoxyphenol.

In the blocked urethane (C) that is used in the present invention, it is important to properly set the amounts of component (C-1) to (C-4) added, from the viewpoint of bonding properties of the resin composition.

The ratio (number of NCO groups/number of NCO reactive groups) between the number of moles of isocyanate groups in the component (C-1) (number of NCO groups) and the total number of moles of hydroxyl groups in the component (C-2) and groups that react with an isocyanate group in the component (C-3) (number of NCO reactive groups) is 1.2 or more and less than 1.8, preferably from 1.3 to 1.7, and more preferably from 1.4 to 1.6. If the ratio is smaller than 1.2, the molecular weight of a urethane polymer that is obtained by reacting the component (C-1) to (C-3) is too large, and the viscosity thereof is also too large, which is not preferable, and, if the ratio is smaller than 1, there is no more isocyanate groups in the urethane polymer, the blocking agent cannot be caused to react, and thus blocked urethane cannot be produced. On the other hand, if the ratio is 1.8 or more, the molecular weight of blocked urethane that is obtained is too small, and various physical properties such as tensile properties and shear properties of the resin composition that has been cured and bonding properties thereof deteriorate, which is not preferable.

The proportion ((number of NCO reactive groups in branching agent)/(total number of moles of NCO reactive groups excluding those in blocking agent)×100) of the number of moles of groups that react with an isocyanate group in the component (C-3) is from 1 to 50% of the total number of moles of hydroxyl groups in the component (C-2) and groups that react with an isocyanate group in the component (C-3), and, from the viewpoint of maintaining the flexibility and the physical properties at a high temperature of the resin composition that has been cured, the proportion is preferably from 5 to 45%, and more preferably from 10 to 41%. If the proportion is lower than 1%, it is difficult to maintain the physical properties at a high temperature of the cured material, and, if the proportion is higher than 50%, the viscosity of the blocked urethane significantly increases, and thus it is difficult to produce the blocked urethane.

The amount of blocking agent used as the component (C-4) is from 0.8 to 1.2 mol, preferably from 0.9 to 1.1 mol, and more preferably from 0.95 to 1.05 mol, with respect to 1 mol of isocyanate group in the urethane polymer having a terminal isocyanate group obtained by reacting the components (C-1), (C-2), and (C-3). The concentration of isocyanate groups (NCO %) in the urethane polymer can be measured as defined in JIS K 1603-1, and the number of moles of NCO groups in the urethane polymer can be measured by converting the obtained NCO % (% by mass) into moles.

From the viewpoint of the balance between the bonding properties and the flexibility of the curable material, the amount of blocked urethane (C) in the present invention used is preferably from 5 to 60% by mass, more preferably from 7 to 50% by mass, and even more preferably from 10 to 40% by mass, with respect to the total mass of the components (A) and (C).

Examples of the amine-based latent curing agent (D) in the present invention include dicyandiamide, modified polyamine, hydrazides, 4,4'-diaminodiphenyl sulfone, boron trifluoride amine complex salt, ureas, and melamine. They may be used alone or in combination of two or more.

The latent curing agent means a curing agent that does not react or merely very slightly react at room temperature (25° C., etc.) and starts to react through heating or the like, contrary to an ordinary curing agent that reacts at room temperature.

Examples of the modified polyamine include epoxy-addition modified products of amines, amidation modified products of amines, acrylate-modified products of amines, isocyanate-modified products of amines, and Mannich-modified products of amines.

Examples of the amines that are used for the modified polyamine include: aliphatic polyamines such as ethylenediamine, diethylenetriamine, triethylenetetramine, tetraethylenepentamine, polyoxypropylenediamine, and polyoxypropylenetriamine; alicyclic polyamines such as isophoronediamine, mensendiamine, bis(4-amino-3-methyl-dicyclohexyl)methane, diaminodicyclohexylmethane, bis(aminomethyl)cyclohexane, N-aminoethyl piperazine, and 3,9-bis(3-aminopropyl)-2,4,8,10-tetraoxaspiro(5.5)undecane; mononuclear polyamines such as m-phenylenediamine, p-phenylenediamine, tolylene-2,4-diamine, tolylene-2,6-diamine, mesitylene-2,4-diamine, mesitylene-2,6-diamine, 3,5-diethyltolylene-2,4-diamine, and 3,5-diethyltolylene-2,6-diamine; aromatic polyamines such as biphenylenediamine, 4,4-diaminodiphenylmethane, 2,5-naphthylenediamine, and 2,6-naphthylenediamine; and imidazoles such as 2-methylimidazole, 2-ethyl-4-methylimidazole, 2-isopropylimidazole, 2-undecylimidazole, 2-heptadecylimidazole, 2-phenylimidazole, 2-phenyl-4-methylimidazole, and 2-aminopropylimidazole.

The epoxy-addition modified products of the above-mentioned amines can be produced by reacting the amines, and various epoxy resins such as phenyl glycidyl ethers, butyl glycidyl ethers, bisphenol A-diglycidyl ethers, bisphenol F-diglycidyl ethers, or glycidyl esters of carboxylic acids, using a common method.

The amidation modified products of the above-mentioned amines can be produced by reacting the amines, and carboxylic acid such as adipic acid, sebacic acid, phthalic acid, isophthalic acid, or dimer acid, using a common method.

The acrylate-modified products of the above-mentioned amines can be produced by reacting the amines, and an acrylic acid ester compound such as ethyl acrylate, n-butyl acrylate, or 2-ethylhexyl acrylate, using a common method.

The isocyanate-modified products of the above-mentioned amines can be produced by reacting the amines, and an isocyanate compound given as an example of the polyisocyanate (C-1), using a common method.

The Mannich-modified products of the above-mentioned amines can be produced by reacting the amines, aldehydes such as formaldehyde, and phenols with an aromatic ring having at least one site that is reactive to aldehyde, such as phenol, cresol, xylenol, tert-butylphenol, or resorcin, using a common method.

Examples of the hydrazides include oxalyl dihydrazide, malonic dihydrazide, succinic dihydrazide, glutaric dihydrazide, adipic dihydrazide, suberic dihydrazide, azelaic dihydrazide, sebacic dihydrazide, and phthalic dihydrazide.

Examples of the ureas include 3-(p-chlorophenyl)-1,1-dimethylurea, 3-(3,4-dichlorophenyl)-1,1-dimethylurea, 3-phenyl-1,1-dimethylurea, isophorone diisocyanate-dimethylurea, and tolylene diisocyanate-dimethylurea.

As the amine-based latent curing agent (D), it is possible to further use a phenol resin in order to improve the storage stability of the composition. Examples of the phenol resin include: compounds having two phenolic hydroxyl groups in one molecule, such as resorcin, catechol, bisphenol A, bisphenol F, and substituted or unsubstituted biphenol; novolac-type phenol resins obtained by condensing or co-condensing at least one phenolic compound and an aldehyde compound such as formaldehyde, acetaldehyde, propionaldehyde, benzaldehyde, or salicylaldehyde, in the presence of an acidic catalyst, the phenolic compound being selected from phenol compounds such as phenol, cresol, xylenol, resorcin, catechol, bisphenol A, bisphenol F, phenylphenol, and aminophenol, and naphthol compounds such as α-naphthol, β-naphthol, and dihydroxynaphthalene; aralkyl-type phenol resins such as phenol aralkyl resins synthesized from the above-mentioned phenolic compound, and dimethoxyparaxylene, bis(methoxymethyl)biphenyl, or the like, and naphthol aralkyl resins; paraxylylene- and/or metaxylylene-modified phenol resins; melamine-modified phenol resins; terpene-modified phenol resins; dicyclopentadiene-type phenol resins synthesized through copolymerization from the above-mentioned phenolic compound and dicyclopentadiene, and dicyclopentadiene-type naphthol resins; cyclopentadiene-modified phenol resins; polycyclic aromatic ring-modified phenol resins; biphenyl-type phenol resins; triphenylmethane-type phenol resins obtained by condensing or co-condensing the above-mentioned phenolic compound, and an aromatic aldehyde compound such as benzaldehyde or salicylaldehyde in the presence of an acidic catalyst; and phenol resins obtained by copolymerizing two or more of these compounds. These phenol resins may be used alone or in combination of two or more.

In the present invention, of these amine-based latent curing agents, it is preferable to use at least one compound selected from the group consisting of dicyandiamide, epoxy-modified polyamine using imidazoles as polyamines (epoxy-modified imidazoles), and ureas, from the viewpoint of obtaining a curable resin composition that is easily available and inexpensive and realizes a good surface contact, and it is more preferable to use dicyandiamide or 3-phenyl-1,1-dimethylurea.

The amount of amine-based latent curing agent (D) used in the present invention is preferably from 1 to 30 parts by mass, and, from the viewpoint of the balance between the viscosity and the curability of the composition, the amount is more preferably from 5 to 15 parts by mass, with respect to 100 parts by mass of the total mass of the epoxy resin (A) and the blocked urethane (C).

It is also possible that the resin composition of the present invention contains a rubber component (B), in addition to the components (A), (C), and (D). If the resin composition contains a rubber component (B), it is possible to improve the bonding properties of the resin composition. In the present invention, examples of the rubber component (B) include liquid rubber and powder rubber with components having a skeleton obtained by polymerizing monomers such as isoprene, butadiene, styrene, acrylonitrile, or chloroprene.

Examples of the liquid rubber include polybutadiene, acrylonitrile butadiene rubber (NBR), butadiene-acrylonitrile rubber (CTBN) in which both terminal ends have a carboxyl group, butadiene-acrylonitrile rubber (ATBN) in which both terminal ends have an amino group, and a rubber-modified epoxy resin obtained by reacting an epoxy resin with CTBN and/or ATBN.

Examples of the powder rubber include acrylonitrile butadiene rubber (NBR), carboxylate-modified NBR, hydrogenated NBR, core-shell rubber, styrene-butadiene rubber, and acrylic rubber.

The core-shell rubber is rubber in which particles form a core layer and a shell layer, and has a two-layer structure in which the shell layer that is the outer layer is made of a glassy polymer, and the core layer that is the inner layer is made of a rubbery polymer, or a three-layer structure in which the shell layer that is the outer layer is made of a glassy polymer, the intermediate layer is made of a rubbery polymer, and the core layer is made of a glassy polymer, for example. The glassy polymer is constituted by, for example, a methyl methacrylate polymer, a methyl acrylate polymer, a styrene polymer, or the like, and the rubbery polymer layer is constituted by, for example, a butyl acrylate polymer (butyl rubber), silicone rubber, polybutadiene, or the like.

In the present invention, of these rubber components, from the viewpoint of improving the bonding properties of the resin composition, it is preferable to use liquid rubber or core-shell rubber, and more preferable to use a rubber-modified epoxy resin obtained by reacting CTBN, or CTBN and/or ATBN.

The amount of rubber component (B) used in the present invention is preferably from 5 to 60 parts by mass, and more preferably from 10 to 40 parts by mass, with respect to 100 parts by mass of the total mass of the epoxy resin (A) and later-described blocked urethane (C), from the viewpoint of the balance between the bonding properties and the usability of the resin composition.

It is also possible that the curable resin composition of the present invention contains an additive other than the above-mentioned components, as necessary. Examples of the additive include: non-reactive diluents (plasticizers) such as dioctylphthalate, dibutylphthalate, benzyl alcohol, and coaltal; fibrous fillers such as glass fiber, pulp fiber, synthetic fiber, and ceramic fiber; reinforcing materials such as glass cloth, aramid cloth, and carbon fiber; pigments; silane coupling agents such as γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, γ-glycidoxypropyltriethoxysilane, β-(3,4-epoxycyclohexyl)ethyltriethoxysilane, vinyltriethoxysilane, N-β-(N-vinyl benzyl aminoethyl)-γ-aminopropyltriethoxysilane, γ-methacryloxypropyltrimethoxysilane, γ-chloropropyltrimethoxysilane, and γ-mercaptopropyltrimethoxysilane; lubricants such as candelilla wax, carnauba wax, wood wax, insect wax, beeswax, lanolin, whale wax, montan wax, petroleum wax, aliphatic wax, aliphatic ester, aliphatic ether, aromatic ester, and aromatic ether; thickeners; thixotropic agents; antioxidants; light stabilizers; ultraviolet absorbers; flame retardants; defoaming agents; rust-preventive agents; ordinarily used additives such as colloidal silica and colloidal alumina. In the present invention, it is also possible to further contain an adhesive resin such as xylene resin or petroleum resin.

The curable resin composition of the present invention can be used, for example, as an adhesive for bonding structural materials in the fields of automobiles, vehicles (bullet trains, trains, etc.), civil engineering, construction, watercraft, aircrafts, space industry, and the like. Furthermore, the curable resin composition can be used as an adhesive for general office work, medical use, and electronic materials, in addition to an adhesive for bonding structural materials. Examples of the adhesive for electronic materials include adhesives for semiconductors such as interlayer adhesives for multilayer substrates (e.g., build-up substrates), die bonding agents, and underfill materials, and adhesives for mounting such as underfill materials for BGA reinforcement, anisotropic conductive films (ACF), and anisotropic conductive pastes (ACP).

The above-described structural material-bonding adhesive can be used for materials such as metals, coating metals, aluminum, plastics, and FRP. The structural material-bonding adhesive of the present invention has excellent proper-

EXAMPLES

Hereinafter, the present invention will be specifically described by way of examples.

Raw materials used in the examples were as follows.

(C-1) Component
  IPDI: isophorone diisocyanate
  HDI: hexamethylene diisocyanate (C-2) Component
  PTMG-2000: polytetramethylene glycol (number average molecular weight 2000, manufactured by Mitsubishi Chemical Corporation)

(C-3) Component
  G-3000B: propylene oxide adduct of glycerin (number average molecular weight 3000, manufactured by ADEKA Corporation)
  TMP: trimethylolpropane
  Boltorn H-2004: compound having six hydroxyl groups, with number average molecular weight of 3200, manufactured by Perstorp
  G-700: propylene oxide adduct of glycerin (number average molecular weight 700, manufactured by ADEKA Corporation)
  Sorbitol (C-4) Component
  PTBP: p-tert-butylphenol
  PCP: p-cumylphenol (manufactured by Sasol)
  PMP: p-methoxyphenol (manufactured by Tokyo Chemical Industry Co., Ltd.)

(A) Component
  EP-4100E: bisphenol A-type epoxy resin (epoxy equivalents: 190 g/eq., manufactured by ADEKA Corporation)

(B) Component
  EPR-1630: rubber-modified epoxy resin (epoxy equivalents: 900 g/eq., manufactured by ADEKA Corporation)

(D) Component
  DICY: dicyandiamide
  Fenuron: 3-phenyl-1,1-dimethylurea

Other Components
  RY-200S: hydrophobic fumed silica (manufactured by Nippon Aerosil Co., Ltd.)

Production Example 1: Synthesis of Blocked Urethane BU-1

First, 300.0 g (number of moles of hydroxyl groups: 0.306 mol) of PTMG-2000 as the component (C-2), 3.96 g (number of moles of hydroxyl groups: 0.089 mol) of TMP as the component (C-3), and 68.2 g (number of moles of isocyanate groups: 0.612 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.45% by mass, 32.6 g (0.217 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-1 was obtained.

Production Example 2: Synthesis of Blocked Urethane BU-2

First, 300.0 g (number of moles of hydroxyl groups: 0.306 mol) of PTMG-2000 as the component (C-2), 27.0 g (number of moles of hydroxyl groups: 0.054 mol) of Boltorn H-2004 as the component (C-3), and 51.5 g (number of moles of isocyanate groups: 0.612 mol) of HDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.79% by mass, 37.8 g (0.252 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-2 was obtained.

Production Example 3: Synthesis of Blocked Urethane BU-3

First, 300.0 g (number of moles of hydroxyl groups: 0.306 mol) of PTMG-2000 as the component (C-2), 1.7 g (number of moles of hydroxyl groups: 0.054 mol) of sorbitol as the component (C-3), and 51.5 g (number of moles of isocyanate groups: 0.612 mol) of HDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.99% by mass, 37.8 g (0.252 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-3 was obtained.

Production Example 4: Synthesis of Blocked Urethane BU-4

First, 300.0 g (number of moles of hydroxyl groups: 0.306 mol) of PTMG-2000 as the component (C-2), 9.47 g (number of moles of hydroxyl groups: 0.212 mol) of TMP as the component (C-3), and 56.6 g (number of moles of isocyanate groups: 0.673 mol) of HDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 1.78% by mass, 23.3 g (0.155 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-4 was obtained.

Production Example 5: Synthesis of Blocked Urethane BU-5

First, 300.0 g (number of moles of hydroxyl groups: 0.306 mol) of PTMG-2000 as the component (C-2), 5.2 g (number of moles of hydroxyl groups: 0.116 mol) of TMP as the component (C-3), and 68.2 g (number of moles of isocyanate groups: 0.612 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.13% by mass, 28.5 g (0.190 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-5 was obtained.

Production Example 6: Synthesis of Blocked Urethane BU-6

First, 300.0 g (number of moles of hydroxyl groups: 0.306 mol) of PTMG-2000 as the component (C-2), 0.7 g (number of moles of hydroxyl groups: 0.016 mol) of TMP as the component (C-3), and 42.0 g (number of moles of isocyanate groups: 0.499 mol) of HDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.17% by mass, 26.7 g (0.178 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-6 was obtained.

Production Example 7: Synthesis of Blocked Urethane BU-7

First, 300.0 g (number of moles of hydroxyl groups: 0.306 mol) of PTMG-2000 as the component (C-2), 29.9 g (number of moles of hydroxyl groups: 0.119 mol) of G-700 as the component (C-3), and 68.5 g (number of moles of isocyanate groups: 0.615 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.17% by mass, 28.5 g (0.190 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-7 was obtained.

Production Example 8: Synthesis of Blocked Urethane BU-8

First, 300.0 g (number of moles of hydroxyl groups: 0.306 mol) of PTMG-2000 as the component (C-2), 4.1 g (number of moles of hydroxyl groups: 0.016 mol) of G-700 as the component (C-3), and 61.0 g (number of moles of isocyanate groups: 0.547 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.17% by mass, 47.9 g (0.225 mol) of PCP was added as the component (C-4), and the mixture was allowed to further react at 90 to 100° C. for 3 hours. After seeing that absorption of NCO disappeared in an IR absorption spectrum, the reaction was ended, and blocked urethane BU-8 was obtained.

Production Example 9: Synthesis of Blocked Urethane BU-9

First, 300.0 g (number of moles of hydroxyl groups: 0.306 mol) of PTMG-2000 as the component (C-2), 29.9 g (number of moles of hydroxyl groups: 0.119 mol) of G-700 as the component (C-3), and 68.5 g (number of moles of isocyanate groups: 0.615 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 2.17% by mass, 23.5 g (0.190 mol) of PMP was added as the component (C-4), and the mixture was allowed to further react at 90 to 100° C. for 3 hours. After seeing that absorption of NCO disappeared in an IR absorption spectrum, the reaction was ended, and blocked urethane BU-9 was obtained.

Production Example 10: Synthesis of Blocked Urethane BU-10

First, 300.0 g (number of moles of hydroxyl groups: 0.294 mol) of G-3000B as the component (C-3) and 66.4 g (number of moles of isocyanate groups: 0.596 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 3.46% by mass, 45.4 g (0.302 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-10 was obtained.

Production Example 11: Synthesis of Blocked Urethane BU-11

First, 300.0 g (number of moles of hydroxyl groups: 0.306 mol) of PTMG-2000 as the component (C-2) and 68.2 g (number of moles of isocyanate groups: 0.612 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 3.49% by mass, 46.0 g (0.306 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-11 was obtained.

Production Example 12: Synthesis of Blocked Urethane BU-12

First, 300.0 g (number of moles of hydroxyl groups: 0.306 mol) of PTMG-2000 as the component (C-2) and 44.3 g (number of moles of isocyanate groups: 0.398 mol) of IPDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 1.12% by mass, 13.8 g (0.092 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-12 was obtained.

Production Example 13: Synthesis of Blocked Urethane BU-13

First, 300.0 g (number of moles of hydroxyl groups: 0.306 mol) of PTMG-2000 as the component (C-2), 1.54 g (number of moles of hydroxyl groups: 0.034 mol) of TMP as the component (C-3), and 51.5 g (number of moles of isocyanate groups: 0.612 mol) of HDI as the component (C-1) were added to a 1-L 5-neck separable round bottom flask equipped with a Dimroth condenser, a stirring blade, and a nitrogen line, and allowed to react with each other at 100 to 110° C. for 3 hours. After seeing that NCO % was 1.80% by mass, 40.9 g (0.272 mol) of PTBP was added as the component (C-4), and the mixture was allowed to further react at 90 to 100° C. for 3 hours. After seeing that absorption of NCO disappeared in an IR absorption spectrum, the reaction was ended, and blocked urethane BU-13 was obtained.

In this production example, the ratio (number of NCO groups/number of NCO reactive groups) between the number of moles of isocyanate groups in the component (C-1) (number of NCO groups) and the total number of moles of hydroxyl groups in the component (C-2) and groups that react with an isocyanate group in the component (C-3) (number of NCO reactive groups) was 1.8.

Production Example 14: Synthesis of Blocked Urethane BU-14

First, 300.0 g (number of moles of hydroxyl groups: 0.306 mol) of PTMG-2000 as the component (C-2), 13.9 g (number of moles of hydroxyl groups: 0.310 mol) of TMP as the component (C-3), and 106.4 g (number of moles of isocyanate groups: 0.955 mol) of IPDI as the component (C-1) were added to a 1-L 5-neck separable round bottom flask equipped with a Dimroth condenser, a stirring blade, and a nitrogen line, and a reaction thereof was started at 100 to 110° C. However, the viscosity in the system increased during the reaction, and thus stirring by the stirring blade was not properly performed, the subsequent blocking reaction was not allowed to occur, and thus blocked urethane BU-14 was not produced.

In this production example, the branching agent proportion ({proportion of number of moles of groups that react with an isocyanate group in component (C-3), relative to total number of moles of hydroxyl groups in component (C-2) and groups that react with an isocyanate group in component (C-3)}×100(%)) was 50.3%.

The blocked urethanes BU-10 to BU-13 obtained in Production Examples 10 to 13 above were comparative samples that are not encompassed in the scope of the blocked urethane for use in the present invention.

The viscosities of the blocked urethanes BU-1 to BU-13 obtained in Production Examples 1 to 13 above were measured using a CAP2000+H (Cone & Plate Viscometer, manufactured by BROOKFIELD), at 100° C. and a number of rotations of 100 ppm. Tables 1 and 2 show the result.

Example 1

First, 70 g of EP-4100E, 30 g of blocked urethane BU-1, 7 g of DICY, 25 g of calcium carbonate, 1 g of Fenuron, and 1 g of RY-200S were added to a 500-ml disposable cup, stirred using a spatula at 25° C. for 5 minutes, and then further stirred using a planetary stirrer, and thus a curable resin composition was obtained. The modulus of elasticity, the maximum point elongation, and the T-type peel strength of the obtained curable resin composition were measured as follows. Table 1 shows the result.

Modulus of Elasticity and Maximum Point Elongation

After the resin composition was cured at 180° C. for 30 minutes, a test piece was produced according to a method as defined in JIS K 7161-1, and the modulus of elasticity and the maximum point elongation thereof were measured. Flexible physical properties are required in the application as structural material-bonding adhesives, and thus those with a modulus of elasticity of 1000 MPa or less were taken as acceptable products, and those with a maximum point elongation of 10% or more were taken as acceptable products.

T-type Peel Strength

After the resin composition was cured at 180° C. for 30 minutes between two adherends respectively made of iron and aluminum, the T-type peel strength at 80° C. was measured as defined in JIS K 6854-3.

Furthermore, after the resin composition was cured at 180° C. for 30 minutes between adherends both made of iron, the T-type peel strength at −40° C. was measured as defined in JIS K 6854-3.

Examples 2 to 4, Examples 6 to 9, and Comparative Examples 1 to 4

Curable resin compositions were obtained in a similar way to that of Example 1, except that the blocked urethane was changed as shown in Tables 1 and 2, and the moduli of elasticity, the maximum point elongations, and the T-type peel strengths of the obtained curable resin compositions were measured. Table 1 shows the result.

Example 5

First, 60 g of EP-4100E, 10 g of EPR-1630, 30 g of blocked urethane BU-5, 7 g of DICY, 25 g of calcium carbonate, 1 g of Fenuron, and 1 g of RY-200S were added to a 500-ml disposable cup, stirred using a spatula at 25° C. for 5 minutes, and then further stirred using a planetary stirrer, and thus a curable resin composition was obtained. The modulus of elasticity, the maximum point elongation, and the T-type peel strength of the obtained curable resin composition were measured as follows. Table 1 shows the result.

TABLE 1

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Blocked urethane | BU-1 | BU-2 | BU-3 | BU-4 | BU-5 | BU-6 | BU-7 | BU-8 | BU-9 |
| NCO index | 1.55 | 1.70 | 1.70 | 1.30 | 1.45 | 1.55 | 1.45 | 1.70 | 1.45 |
| Branching agent proportion (%) | 23 | 15 | 15 | 41 | 28 | 5 | 28 | 5 | 28 |
| Viscosity (mPa*s) | 34000 | 12000 | 13500 | 90000 | 74900 | 17100 | 21400 | 12000 | 21100 |
| Modulus of elasticity (MPa) | 880 | 1000 | 980 | 680 | 750 | 680 | 980 | 880 | 970 |
| Maximum point elongation (%) | 29 | 17 | 19 | 42 | 34 | 32 | 31 | 31 | 28 |

TABLE 1-continued

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Peel strength (KN/m) (Fe/Al, 80° C.) | 3.83 | 3.90 | 3.75 | 3.80 | 4.30 | 3.40 | 3.80 | 3.80 | 4.40 |
| Peel strength (KN/m) (Fe/Fe, −40° C.) | 14.2 | 12.7 | 11.8 | 13.7 | 15.1 | 13.6 | 14.5 | 13.8 | 15.3 |
| Comprehensive evaluation | Acceptable | Acceptable | Acceptable | Acceptable | Acceptable | Acceptable | Acceptable | Acceptable | Acceptable |

TABLE 2

|  | Com. Ex. 1 | Com. Ex. 2 | Com. Ex. 3 | Com. Ex. 4 |
|---|---|---|---|---|
| Blocked urethane | BU-10 | BU-11 | BU-12 | BU-13 |
| NCO index | 2.03 | 2.00 | 1.30 | 1.80 |
| Branching agent proportion (%) | 0 | 0 | 0 | 10 |
| Viscosity (mPa*s) | 1050 | 6125 | 45000 | 8400 |
| Modulus of elasticity (MPa) | 2100 | 1500 | 750 | 1500 |
| Maximum point elongation (%) | 4 | 12 | 52 | 13 |
| Peel strength (KN/m) (Fe/Al, 80° C.) | 4.3 | 1.0 | 0.8 | 3.7 |
| Peel strength (KN/m) (Fe/Fe, −40° C.) | 11.8 | 10.8 | 10.7 | 9.9 |
| Comprehensive evaluation | Not acceptable | Not acceptable | Not acceptable | Not acceptable |

In Tables 1 and 2, the NCO index refers to the ratio (number of NCO groups/number of NCO reactive groups) between the number of moles of isocyanate groups in the component (C-1) (number of NCO groups) and the total number of moles of hydroxyl groups in the component (C-2) and groups that react with an isocyanate group in the component (C-3) (number of NCO reactive groups) when blocked urethane used in each example was produced, and the branching agent proportion (%) refers to the proportion of the number of moles of groups that react with an isocyanate group in the component (C-3), relative to the total number of moles of hydroxyl groups in the component (C-2) and groups that react with an isocyanate group in the component (C-3), ((number of NCO reactive groups in branching agent/total number of moles of NCO reactive groups excluding those in blocking agent)×100).

It was seen from the results in Tables 1 and 2 that the curable resin composition of the present invention has good modulus of elasticity and good maximum point elongation, and further has good T-type peel strength for iron and aluminum, and thus it is excellent in terms of properties for bonding iron and aluminum. It was seen that samples not using the curable resin composition of the present invention were not satisfactory in the evaluation of any of the modulus of elasticity, the maximum point elongation, and the T-type peel strength.

The invention claimed is:

1. A curable resin composition comprising an epoxy resin (A), blocked urethane (C), and an amine-based latent curing agent (D),
wherein the blocked urethane (C) is obtained by reacting a urethane polymer having a terminal isocyanate group with a blocking agent (C-4), the urethane polymer being obtained by reacting a polyisocyanate (C-1), a diol (C-2), and a branching agent (C-3) containing at least three groups that react with an isocyanate group,
the ratio (number of NCO groups/number of NCO reactive groups) between the number of moles of isocyanate groups in the component (C-1) (number of NCO groups) and the total number of moles of hydroxyl groups in the component (C-2) and groups that react with an isocyanate group in the component (C-3) (number of NCO reactive groups) is from 1.4 to 1.6, and
the proportion of the number of moles of groups that react with an isocyanate group in the component (C-3) is from 10 to 41% of the total number of moles of hydroxyl groups in the component (C-2) and groups that react with an isocyanate group in the component (C-3), and
wherein the component (C-3) is at least one member selected from the group consisting of a propylene oxide adduct of glycerin and a propylene oxide adduct of trimethylolpropane.

2. The curable resin composition according to claim 1, further comprising a rubber component (B).

3. The curable resin composition according to claim 1, wherein the diol (C-2) is at least one selected from the group consisting of a propylene oxide using water or propylene glycol as an addition polymer initiator, and a polytetramethylene glycol.

4. A structural material-bonding adhesive comprising the curable resin composition according to claim 1.

5. A cured material obtained by curing the curable resin composition according to claim 1.

6. The curable resin composition according to claim 2, wherein the diol (C-2) is at least one selected from the group consisting of a propylene oxide using water or propylene glycol as an addition polymer initiator, and a polytetramethylene glycol.

7. A structural material-bonding adhesive comprising the curable resin composition according to claim 2.

8. A structural material-bonding adhesive comprising the curable resin composition according to claim 3.

9. A cured material obtained by curing the curable resin composition according to claim 2.

10. A cured material obtained by curing the curable resin composition according to claim 3.

* * * * *